(12) United States Patent
Kido et al.

(10) Patent No.: US 11,858,049 B2
(45) Date of Patent: Jan. 2, 2024

(54) CEMENTED CARBIDE AND TOOL CONTAINING THE SAME

(71) Applicant: Sumitomo Electric Industries, Ltd., Osaka (JP)

(72) Inventors: Yasuki Kido, Osaka (JP); Katsumi Okamura, Osaka (JP); Chiaki Tokuda, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/792,711

(22) PCT Filed: Jan. 19, 2022

(86) PCT No.: PCT/JP2022/001805
§ 371 (c)(1),
(2) Date: Jul. 14, 2022

(87) PCT Pub. No.: WO2023/139695
PCT Pub. Date: Jul. 27, 2023

(65) Prior Publication Data
US 2023/0278109 A1    Sep. 7, 2023

(51) Int. Cl.
*B23B 27/14*    (2006.01)
*C22C 29/00*    (2006.01)
*C22C 29/02*    (2006.01)

(52) U.S. Cl.
CPC ............ *B23B 27/14* (2013.01); *C22C 29/005* (2013.01); *C22C 29/02* (2013.01); *B23B 2224/28* (2013.01)

(58) Field of Classification Search
None
See application file for complete search history.

(56) References Cited

U.S. PATENT DOCUMENTS

| | | | |
|---|---|---|---|
| 2009/0113810 A1* | 5/2009 | Laarz ...................... | C22C 29/08 501/87 |
| 2018/0222804 A1 | 8/2018 | Kido et al. | |

(Continued)

FOREIGN PATENT DOCUMENTS

| | | |
|---|---|---|
| JP | 2000-126905 A | 5/2000 |
| JP | 2001-502249 A | 2/2001 |

(Continued)

OTHER PUBLICATIONS

Written Opinion dated Mar. 22, 2022, received for PCT Application PCT/JP2022/001805, filed on Jan. 19, 2022, 7 pages including English Translation.

*Primary Examiner* — Seth Dumbris
(74) *Attorney, Agent, or Firm* — XSENSUS LLP

(57) ABSTRACT

A cemented carbide composed of a first hard phase, a second hard phase and a binder phase, in which the first hard phase is composed of tungsten carbide particles, the second hard phase is composed of at least one first compound selected from the group consisting of TiNbC, TiNbN and TiNbCN, the second hard phase has an average particle diameter of no more than 0.1 μm, the second hard phase has a dispersity of no more than 0.7, the second hard phase has a content of no less than 0.1 vol % and no more than 15 vol %, the binder phase contains at least one first element selected from the group consisting of iron, cobalt and nickel, and the binder phase has a content of no less than 0.1 vol % and no more than 20 vol %.

8 Claims, 4 Drawing Sheets

(56) References Cited

U.S. PATENT DOCUMENTS

| | | | |
|---|---|---|---|
| 2020/0048747 A1 | 2/2020 | Michiuchi et al. | |
| 2020/0291504 A1* | 9/2020 | Fukae | B23B 27/14 |
| 2021/0025038 A1* | 1/2021 | Fukae | C22C 29/04 |
| 2021/0040587 A1 | 2/2021 | Yamanishi et al. | |
| 2022/0090237 A1 | 3/2022 | Fukae et al. | |

FOREIGN PATENT DOCUMENTS

| | | |
|---|---|---|
| JP | 2012-251242 A | 12/2012 |
| JP | 2016-98393 A | 5/2016 |
| JP | 2021-110010 A | 8/2021 |
| JP | 6969732 B1 | 11/2021 |
| WO | 98/16665 A1 | 4/1998 |
| WO | 2017/191744 A1 | 11/2017 |
| WO | 2018/194018 A1 | 10/2018 |
| WO | 2020/090280 A1 | 5/2020 |

* cited by examiner

CEMENTED CARBIDE AND TOOL CONTAINING THE SAME

TECHNICAL FIELD

The present disclosure relates to a cemented carbide and a tool containing the same.

BACKGROUND ART

Conventionally, cemented carbides including a phase containing tungsten carbide (WC) as a main component, a phase composed of a carbide, a nitride, a carbonitride and the like containing a metallic element other than tungsten and a binder phase containing an iron group element as a main component are in use as a material for cutting tools (Patent Literature 1 to Patent Literature 5).

CITATION LIST

Patent Literature

PTL 1: PTC International Publication No. WO 2017/191744
PTL 2: Japanese Patent Laying-Open No. 2012-251242
PTL 3: PTC International Publication No. 2018194018
PTL 4: Japanese Patent Laying-Open No. 2016-98393
PTL 5: Japanese Patent Laying-Open No. 2021-110010

SUMMARY OF INVENTION

A cemented carbide of the present disclosure is a cemented carbide composed of a first hard phase, a second hard phase and a binder phase,
  in which the first hard phase is composed of tungsten carbide particles,
  the second hard phase is composed of at least one first compound selected from the group consisting of TiNbC, TiNbN and TiNbCN.
  the second hard phase has an average particle diameter of no more than 0.1 μm,
  the second hard phase has a dispersity of no more than 0.7,
  a content of the second hard phase is no less than 0.1 vol % and no more than 15 vol %,
  the binder phase contains at least one first element selected from the group consisting of iron, cobalt and nickel, and
  a content of the binder phase is no less than 0.1 vol % and no more than 20 vol %.

A cemented carbide of the present disclosure is a cemented carbide composed of a first hard phase, a third hard phase and a binder phase.
  in which the first hard phase is composed of tungsten carbide particles,
  the third hard phase is composed of at least one second compound selected from the group consisting of TiTaC, TiTaN and TiTaCN,
  the third hard phase has an average particle diameter of no more than 0.1 μm,
  the third hard phase has a dispersity of no more than 0.7,
  a content of the third hard phase is no less than 0.1 vol % and no more than 15 vol %,
  the binder phase contains at least one first element selected from the group consisting of iron, cobalt and nickel, and
  a content of the binder phase is no less than 0.1 vol % and no more than 20 vol %.

A tool of the present disclosure is a tool containing the cemented carbide.

DETAILED DESCRIPTION

Figure 1:
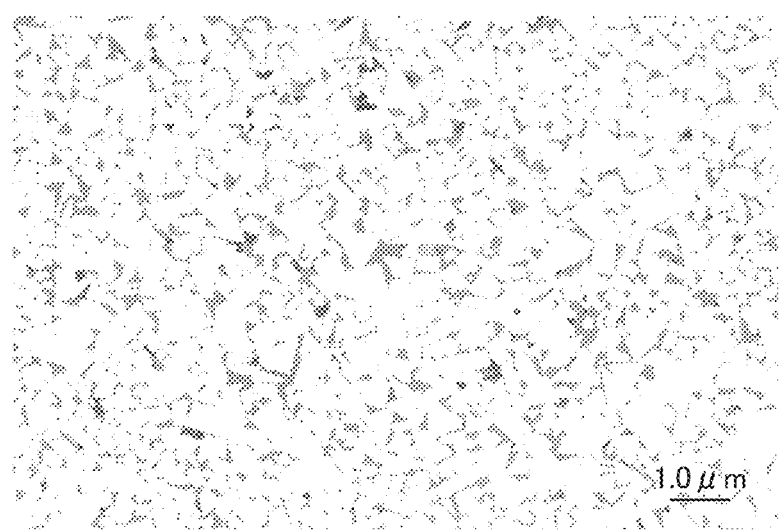
FIG. 1 is an example of backscattered electron image of cemented carbide of Embodiment 1.

Problem to be Solved by the Present Disclosure

Recently, a demand for cost reduction has grown more intense, and tools having a long service life have been requested even in, for example, the high-efficiency processing of a difficult-to-cut material such as a titanium alloy or a nickel alloy. Thus, an objective of the present disclosure is to provide a cemented carbide enabling the extension of service lives of tools in the case of being used as tool materials and a tool containing the same.

Advantageous Effect of the Present Disclosure

A tool containing the cemented carbide of the present disclosure is capable of having a long tool service life.

DESCRIPTION OF EMBODIMENTS

First, embodiments of the present disclosure will be listed and described
(1) A cemented carbide of the present disclosure is a cemented carbide composed of a first hard phase, a second hard phase and a binder phase,
  in which the first hard phase is composed of tungsten carbide particles,
  the second hard phase is composed of at least one first compound selected from the group consisting of TiNbC, TiNbN and TiNbCN,
  the second hard phase has an average particle diameter of no more than 0.1 μm,
  the second hard phase has a dispersity of no more than 0.7,
  a content of the second hard phase is no less than 0.1 vol % and no more than 15 vol %,
  the binder phase contains at least one first element selected from the group consisting of iron, cobalt and nickel, and
  a content of the binder phase is no less than 0.1 vol % and no more than 20 vol %.

A tool containing the cemented carbide of the present disclosure is capable of having a long tool service life.
(2) In a 24.9 μm×18.8 μm rectangular measurement visual field set in an image after a binarization treatment of a backscattered electron image that is obtained by capturing a cross section of the cemented carbide with a scanning electron microscope, the number of the second hard phases is preferably no less than 30. In such a case, the adhesion resistance of the cemented carbide is improved.

(3) The second hard phase preferably has an average particle diameter of no less than 0.01 μm and no more than 0.08 μm. In such a case, the adhesion resistance of the cemented carbide is improved.

(4) The second hard phase preferably has a dispersity of no more than 0.4. In such a case, the adhesion resistance of the cemented carbide is improved.

(5) The dispersity is a standard deviation of an area of each Voronoi cell in a Voronoi diagram that is obtained by performing a Voronoi partition with a center of gravity of the second hard phase as a generator, and the Voronoi diagram is obtained by extracting the second hard phases in a backscattered electron image obtained by capturing a cross section of the cemented carbide with a scanning electron microscope, setting a 24.9 μm×18.8 μm rectangular measurement visual field in an image after a binarization treatment of the backscattered electron image, performing Voronoi partitions with centers of gravity of the extracted second hard phases as generators and calculating Voronoi cells of all of the generators.

(6) A cemented carbide of the present disclosure is a cemented carbide composed of a first hard phase, a third hard phase and a binder phase, in which the first hard phase is composed of tungsten carbide particles, the third hard phase is composed of at least one second compound selected from the group consisting of TiTaC, TiTaN and TiTaCN, the third hard phase has an average particle diameter of no more than 0.1 μm, the third hard phase has a dispersity of no more than 0.7, a content of the third hard phase is no less than 0.1 vol % and no more than 15 vol %, the binder phase contains at least one first element selected from the group consisting of iron, cobalt and nickel, and a content of the binder phase is no less than 0.1 vol % and no more than 20 vol %.

A tool containing the cemented carbide of the present disclosure is capable of having a long tool service life.

(7) A tool of the present disclosure is a tool containing the cemented carbide. The tool of the present disclosure is capable of having a long tool service life.

DETAILS OF EMBODIMENTS OF PRESENT DISCLOSURE

A numerical expression in the form of "A to B" herein means the upper limit and lower limit of a range (that is, no less than A and no more than B), and, when a unit is not put after A but put after B only, the unit of A and the unit of B are the same.

When a compound or the like is herein represented by a chemical formula, the atomic proportion, unless particularly limited, should include all conventionally-known atomic proportions and not be necessarily limited only to atomic proportions within the stoichiometric range. For example, in the case of "TiNbC", the proportion of the numbers of atoms composing TiNbC include all conventionally-known atomic proportions.

When a pressure is herein specified, the pressure means a pressure based on atmospheric pressure unless particularly limited.

In the development of a tool having a long service life even in the high-efficiency processing of a difficult-to-cut material, the present inventors produced a tool for which a conventional cemented carbide was used and performed high-efficiency processing on a difficult-to-cut material. As a result, it was found that, in the tool for which a conventional cemented carbide was used, adhesion of a work material on the tool caused by the processing makes the tool service life reached. This is presumed to be because the adhesion degrades the defect resistance or the dimensional accuracy. Therefore, the present inventors developed a cemented carbide with attention particularly paid to the adhesion resistance of tools and afforded the cemented carbide of the present disclosure and a tool containing the same.

Hereinafter, specific examples of the cemented carbide of the present disclosure and a tool containing the same will be described with reference to the drawings. In the drawings of the present disclosure, the same reference sign indicates the same portions or equivalent portions. In addition, dimensional relationships of lengths, widths, thicknesses, depths and die like have been modified as appropriate in order for the clarification and simplification of the drawings and do not necessarily indicate actual dimensional relationships.

Embodiment 1: Cemented Carbide (1)

A cemented carbide of an embodiment of the present disclosure thereinafter, also referred to as "Embodiment 1") is a cemented carbide composed of a first hard phase, a second hard phase and a binder phase, in which the first hard phase is composed of tungsten carbide particles, the second hard phase is composed of at least one first compound selected from the group consisting of TiNbC, TiNbN and TiNbCN, the second hard phase has an average particle diameter of no more than 0.1 μm, the second hard phase has a dispersity of no more than 0.7, the content of the second hard phase is no less than 0.1 vol % and no more than 15 vol %, the binder phase contains at least one first element selected from the group consisting of iron, cobalt and nickel, and the content of the binder phase is no less than 0.1 vol % and no more than 20 vol %.

A tool containing the cemented carbide of the present disclosure is capable of having a long tool service life. This is presumed to be because the cemented carbide has excellent adhesion resistance.

<Composition of Cemented Carbide>

The cemented carbide of Embodiment 1 is composed of a first hard phase, a second hard phase and a binder phase. The cemented carbide may also contain an impurity as long as the effect of the present disclosure is not impaired. That is, the cemented carbide may consist of a first hard phase, a second hard phase, a binder phase and an impurity. Examples of the impurity include iron (Fe), molybdenum (Mo), calcium (Ca), silicon (Si) and sulfur (S). The content of the impurity in the cemented carbide (in a case where two or more kinds of impurities are contained, the total content thereof) is preferably no less than 0 mass % and less than 0.1 mass %. The content of the impurity in the cemented carbide is measured by inductively coupled plasma emission spectroscope (measuring instrument "ICPS-8100" (trademark) by Shimadzu Corporation).

In Embodiment 1, the lower limit of the content of the first hard phase in the cemented carbide can be set to no less than 65 vol %, no less than 70 vol %, no less than 75 vol % or no less than 80 vol %. The upper limit of the content of the first hard phase in the cemented carbide can be set to no more than 99.8 vol %, no more than 99 vol %, no more than 98 vol % or no more than 97 vol %. The content of the first hard phase in the cemented carbide can be set to no less than 65 vol % and no more than 99 vol %, no less than 70 vol % and no more than 99.8 vol %, no less than 75 vol % and no more than 99.8 vol %, no less than 80 vol % and no more than 99.8 vol %, no less than 65 vol % and no more than 99 vol %, no less than 70 vol % and no more than 99 vol %, no less than 75 vol % and no more than 99 vol %, no less than 80 vol % and no more than 99 vol %, no less than 65 vol % and no more than 98 vol %, no less than 70 vol % and no more than 98 vol %, no less than 75 vol % and no more than 98 vol %, no less than 80 vol % and no more than 98 vol %, no less than 65 vol % and no more than 97 vol %, no less than 70 vol % and no more than 97 vol %, no less than 75 vol % and no more than 97 vol % or no less than 80 vol % and no more than 97 vol %.

In Embodiment 1, the content of the second hard phase in the cemented carbide is no less than 0.1 vol % and no more than 15 vol %. In such a case, the adhesion resistance of the cemented carbide is improved. The lower limit of the content of the second hard phase in the cemented carbide can be set to no less than 0.10 vol %, no less than 0.2 vol %, no less than 0.5 vol % or no less than 1 vol %. The upper limit of the content of the second hard phase in the cemented carbide can be set to no more than 15 vol %, no more than 14 vol %, no more than 12 vol % or no more than 10 vol %. The content of the second hard phase in the cemented carbide can be set to no less than 0.10 vol % and no more than 15 vol %, no less than 0.2 vol % and no more than 15 vol %, no less than 0.5 vol % and no more than 15 vol %, no less than 1 vol % and no more than 15 vol %, no less than 0.10 vol % and no more than 14 vol %, no less than 0.2 vol % and no more than 14 vol %, no less than 0.5 vol % and no more than 14 vol %, no less than 1 vol % and no more than 14 vol %, no less than 0.10 vol % and no more than 12 vol %, no less than 0.2 vol % and no more than 12 vol %, no less than 0.5 vol % and no more than 12 vol %, no less than 1 vol % and no more than 12 vol %, no less than 0.10 vol % and no more than 10 vol %, no less than 0.2 vol % and no more than 10 vol %, no less than 0.5 vol % and no more than 10 vol % or no less than 1 vol % and no more than 10 vol %.

In Embodiment 1, the content of the binder phase in the cemented carbide is no less than 0.1 vol % and no more than 20 vol %. In such a case, the strength of the cemented carbide is improved. The lower limit of the content of the binder phase in the cemented carbide can be set to no less than 0.10 vol %, no less than 0.3 vol %, no less than 0.5 vol % or no less than 1 vol %. The upper limit of the content of the binder phase in the cemented carbide can be set to no more than 20 vol %, no more than 18 vol %, no more than 16 vol % or no more than 14 vol % The content of the binder phase in the cemented carbide can be set to no less than 0.10 vol % and no more than 20 vol %, no less than 0.3 vol % and no more than 20 vol %, no less than 0.5 vol % and no more than 20 vol %, no less than 1 vol % and no more than 20 vol %, no less than 0.10 vol % and no more than 18 vol %, no less than 0.3 vol % n and no more than 18 vol %, no less than 0.5 vol % and no more than 18 vol %, no less than 1 vol % and no more than 18 vol %, no less than 0.10 vol % and no more than 16 vol %, no less than 0.3 vol % and no more than 16 vol %, no less than 0.5 vol % and no more than 16 vol %, no less than 1 vol % and no more than 16 vol %, no less than 0.10 vol % and no more than 14 vol %, no less than 0.3 vol % and no more than 14 vol %, no less than 0.5 vol % and no more than 14 vol % or no less than 1 vol % and no more than 14 vol %.

A method for measuring the content of the first hard phase, the content of the second hard phase and the content of the binder phase in the cemented carbide is as described below.

(A1) The cemented carbide is cut at any position to expose a cross section. The cross section is mirror-like finished with a CROSS SECTION POLISHER (manufactured by JEOL Ltd.).

(B1) The mirror-like finished surface of the cemented carbide is analyzed using scanning electron microscopy with energy dispersive X-ray spectroscopy (SEM-EDX) (device: Gemini 450 (trademark) manufactured by Carl Zeiss AG), and elements that are contained in the cemented carbide are specified.

(C1) The mirror-like finished surface of the cemented carbide is captured with a scanning electron microscope (SEM) to obtain a backscattered electron image. The captured region of the captured image is set to the central portion of the cross section of the cemented carbide, that is, a position where a portion having properties clearly different from those of the bulk portion, such as a vicinity of the surface of the cemented carbide, is not included (a position where all of the captured region becomes the bulk portion of the cemented carbide). The observation magnification is 5000 times. The measurement conditions are an accelerating voltage of 3 kV, a current value of 2 nA and a working distance (WD) of 5 mm.

(D1) The captured region of the (C1) is analyzed using an energy dispersive X-ray spectrometer with a scanning electron microscope (SEM-EDX), the distribution of the elements specified in the (B1) in the captured region is specified, and an element mapping image is obtained.

(E1) The back scattered electron image obtained in the (C1) is loaded onto a computer, and a binarization treatment is performed using image analysis software (OpenCV, SciPy). The binarization treatment is performed such that, among the first hard phase, the second hard phase and the binder phase in the backscattered electron image, only the second hard phase is extracted. The binarization threshold varies with contrast and is thus set for each image.

An example of the backscattered electron image of the cemented carbide of the present embodiment is shown in FIG. 1. In FIG. 1, white regions correspond to the first hard phase, gray regions correspond to the binder phase and black regions correspond to the second hard phase. The binarization threshold is set such that only the black regions are exposed in the backscattered electron image.

(F1) The element mapping image obtained in the (D1) and the binarized image obtained in the (E1) are overlapped, thereby specifying the presence region of each of the first hard phase, the second hard phase and the binder phase on the binarized image. Specifically, regions which are shown in white on the binarized image and in which tungsten (W) and carbon (C) are present on the element mapping image correspond to the presence regions of the first hard phase. Regions which are shown in black on the binarized image and in which titanium (Ti), niobium (Nb) and one or both of carbon (C) and nitrogen (N) are present on the element mapping image correspond to the presence regions of the second hard phase. Regions which are shown in white on the binarized image and in which at least one element selected from the group consisting of iron, cobalt and nickel is present on the element mapping image correspond to the presence regions of the binder phase.

(G1) One 24.9 µm×18.8 µm rectangular measurement visual field is set in the binarized image after the binarization treatment. The area percentage of each of the first hard phase, the second hard phase and the binder phase is measured with respect to the area of the entire measurement region as a denominator using the image analysis software.

(H1) The measurement of the (G1) is performed in five measurement visual fields that do not overlap one another. In the present specification, the average of the area percentages of the first hard phase in the five measurement visual fields corresponds to the content (vol %) of the first hard phase in the cemented carbide, the average of the area percentages of the second hard phase in the five measurement visual fields corresponds to the content (vol %) of the second hard phase in the cemented carbide, and the average of the area percentages of the binder phase in the five measurement visual fields corresponds to the content (vol %) of the binder phase in the cemented carbide.

It was confirmed from the measurement on the same specimen by the applicant that, even when any cutting spot was set on the cross section of the cemented carbide, any captured region that is described in the (C1) was set on the cross section, any five measurement visual fields that are described in die (H1) were set, and the content of the first hard phase, the content of the second hard phase and the content of the binder phase in the cemented carbide were measured a plurality of times according to the above-described procedure, variations in the measurement results were small, and, even when any cutting spot was set on the cross section of the cemented carbide, any captured region on the backscattered electron image was set, and any measurement visual fields were set, the measurement results were not arbitrary.

<First Hard Phase>
<<Composition>>

In Embodiment 1, the first hard phase is composed of tungsten carbide particles (hereinafter, also referred to as "WC particles"). The tungsten carbide particles (hereinafter, also referred to as "WC particles") are particles made of tungsten carbide. The first hard phase may contain iron (Fe), molybdenum (Mo), calcium (Ca), silicon (Si), sulfur (S) and the like in the WC particles or together with the WC particles as long as the effect of the present disclosure is not impaired. The content of iron (Fe), molybdenum (Mo), calcium (Ca), silicon (Si) and sulfur (S) in the first hard phase (in a case where two or more thereof are contained, the total content thereof) is preferably no less than 0 mass % and less than 0.1 mass %. The content of iron (Fe), molybdenum (Mo), calcium (Ca), silicon (Si) and sulfur (S) in the first hard phase is measured by ICP emission spectroscopy <<Average Particle Diameter>>

The lower limit of the average particle diameter of the tungsten carbide particles in Embodiment 1 is preferably no less than 0.2 µm or no less than 0.4 µm. The upper limit of the average particle diameter of the tungsten carbide particles is preferably no more than 3.0 µm or no more than 2.5 µm. The average particle diameter of the tungsten carbide particles is preferably no less than 0.2 µm and no more than 3.0 µm, no less than 0.4 µm and no more than 3.0 µm, no less than 0.2 µm and no more than 2.5 µm or less or no less than 0.4 µm and no more than 2.5 µm In such a case, the cemented carbide has high hardness, and the wear resistance of a tool containing the cemented carbide is improved. In addition, the tool can have excellent breakage resistance.

In the present specification, the average particle diameter of the tungsten carbide particles means D50 (an equivalent circle diameter at which the cumulative number-based frequency reaches 50%, median diameter D50) of equal area equivalent circle diameters (Heywood diameters) of the tungsten carbide particles. A method for measuring the average particle diameter of the tungsten carbide particles is as described below.

(A2) A presence region of the first hard phase (corresponding to the tungsten carbide particles) is specified on the binarized image by the same method as the (A1) to (F1) of the method for measuring the content of the first hard phase, the content of the second hard phase and the content of the binder phase in the cemented carbide.

(B2) One 24.9 µm×18.8 µm rectangular measurement visual field is set in the binarized image. The outer edge of each tungsten carbide particle in the measurement visual field is specified using the image analysis software, and the equivalent circle diameter (Heywood diameter: equal area equivalent circle diameter) of each tungsten carbide particle is calculated.

(C2) D50 of the equal area equivalent circle diameters of the tungsten carbide particles is calculated based on all of the tungsten carbide particles in the measurement visual field.

It was confirmed from the measurement on the same specimen by the applicant that, even when any cutting spot was set on the cross section of the cemented carbide, any captured region that is described in the (C1) was set on the cross section, any measurement visual field that is described in the (B2) was set, and the average particle diameter of the tungsten carbide particles was measured a plurality of times according to the above-described procedure, a variation in the measurement results was small, and, even when any cutting spot was set on the cross section of the cemented carbide, any captured region on the captured image was set, and any measurement visual fields were set, the measurement results are not arbitrary.

<Second Hard Phase>
<<Composition>>

In Embodiment 1, the second hard phase is composed of at least one first compound selected from the group consisting of TiNbC, TiNbN and TiNbCN. In such a case, the adhesion resistance of the cemented carbide is improved.

The second hard phase is not limited to pure TiNbC, TiNbN and TiNbCN and may contain, in addition to the above-described compounds, a metallic element such as tungsten (W), chromium (Cr) or cobalt (Co) to an extent that the effect of the present disclosure is not impaired. The total content of W, Cr and Co in the second hard phase is preferably no less than 0 mass % and less than 0.1 mass %. The contents of W, Cr and Co in the second hard phase are measured by ICP emission spectroscopy.

The second hard phase is preferably composed of a plurality of crystal grains. Examples of the crystal grains that are included in the second hard phase include TiNbC particles, TiNbN particles, TiNbCN particles and particles made of two or more first compounds selected from the group consisting of TiNbC. TiNbN and TiNbCN.

The second hard phase may be composed of crystal grains all having the same composition. For example, the second hard phase may be composed of TiNbC particles. The second hard phase may be composed of TiNbN particles. The second hard phase may be composed of TiNbCN particles. The second hard phase may be composed of particles made of two or more first compounds selected from the group consisting of TiNbC, TiNbN and TiNbCN The second hard phase may be composed of crystal grains having two or more different compositions. For example, the second hard phase may be composed of two or more kinds of crystal grains selected from the group consisting of TiNbC particles. TiNbN panicles, TiNbCN particles and particles made of two or more first compounds selected from the group consisting of TiNbC, TiNbN and TiNbCN. The second hard phase may be composed of TiNbC particles, TiNbN particles and TiNbCN particles.

A method for measuring the composition of the second hard phase is as described below.

(A3) The cemented carbide is sliced at any position using an ion slicer (device: IB09060CIS (trademark) manufactured by JEOL Ltd.) to produce a sample having a thickness of 30 to 100 nm. The accelerating voltage of the ion slicer is 6 kV in the slicing process and 2 kV in the finishing process.

Figure 2:
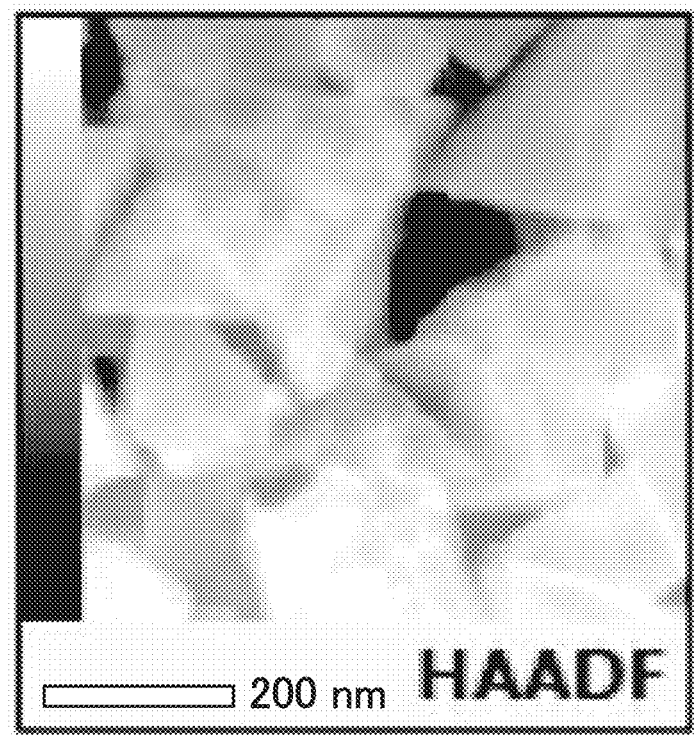
FIG. 2 is an example of STEM-HAADF image of the cemented carbide of Embodiment 1.

(B3) The sample is observed with a scanning electron microscope (STEM) (device: JFM-ARM300F (trademark) manufactured by JEOL Ltd.) at 50000 times to obtain a high-angle annular dark field scanning transmission electron microscope (STEM-HAADF) image. The captured region of the STEM-HAADF image is set to the central portion of the sample, that is, a position where a portion having properties clearly different from those of the bulk portion, such as a vicinity of the surface of the cemented carbide, is not included (a position where all of the captured region becomes the bulk portion of the cemented carbide). Regarding the measurement condition, the accelerating voltage is 200 kV. FIG. 2 is an example of the STEM-HAADF image of the cemented carbide of Embodiment 1.

Figure 3:
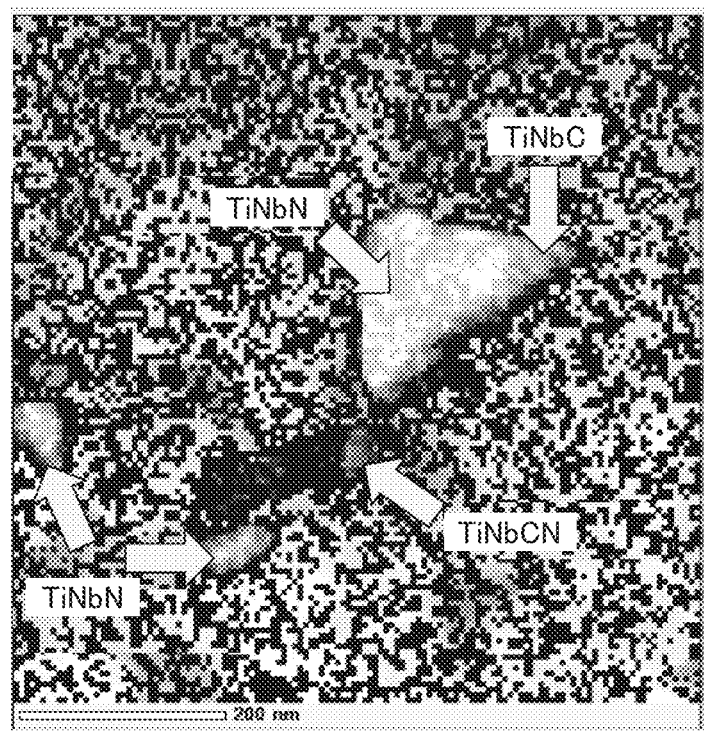
FIG. 3 is an element mapping image of the cemented carbide of Embodiment 1.

(C3) Next, element mapping analysis is performed on the STEM-HAADF image with EDX in STEM to obtain an element mapping image. A region in which titanium (Ti), niobium (Nb) and one or both of carbon (C) and nitrogen (N) are present on the element mapping image is specified as the second hard phase, and the composition of the second hard phase is specified. When the second hard phase is composed of a plurality of crystal grains, the composition is specified for each crystal grain. FIG. 3 is an element mapping image of the cemented carbide of Embodiment 1 in the same measurement visual field in FIG. 1. In the lower left part of FIG. 3, two second hard phases (crystal grains) composed of TiNbN are confirmed. In the slightly upper right part from the center in FIG. 3, one second hard phase (crystal grains) composed of TiNbN and TiNbC is confirmed. In the slightly lower part from the center in FIG. 3, one second hard phase (crystal grains) composed of TiNbCN is confirmed.

It was confirmed from the measurement on the same specimen by the applicant that, even when any cutting spot was set on the cross section of the cemented carbide, any captured region of the STEM-HAADF image was set on the sample, and the composition of the second hard phase was measured a plurality of times according to the above-described procedure, a variation in the measurement result was small, and, even when any cutting spot was set on the cross section of the cemented carbide, and any captured region of the STEM-HAADF image was set, the measurement result was not arbitrary.

In the second hard phase, the lower limit of the ratio of niobium to the sum of titanium and niobium in terms of the number of atoms (hereinafter, also referred to as "Nb ratio") may be set to no less than 0.03, no less than 0.04 or no less than 0.05. The upper limit of the Nb ratio may be set to no more than 0.48, no more than 0.46, no more than 0.44 or no more than 0.42. The Nb ratio may be set to no less than 0.03 and no more than 0.48, no less than 0.04 and no more than 0.48, no less than 0.05 and no more than 0.48, no less than 0.03 and no more than 0.46, no less than 0.04 and no more than 0.46, no less than 0.05 and no more than 0.46, no less than 0.03 and no more than 0.44, no less than 0.04 and no more than 0.44, no less than 0.05 and no more than 0.44, no less than 0.03 and no more than 0.42, no less than 0.04 and no more than 0.42 or no less than 0.05 and no more than 0.42. In such a case, the second hard phase can be finely dispersed in the cemented carbide, and the adhesion resistance of the cemented carbide is improved.

In the present specification, the ratio of niobium to the sum of titanium and niobium in terms of the number of atoms in the second hard phase means the average of the ratios (Nb ratios) of niobium to the sum of titanium and niobium in terms of the number of atoms in all of the second hard phases that are included in the cemented carbide. The Nb ratio is obtained by the following procedure A 24.9 μm×18.8 μm rectangular measurement visual field is set in the element mapping image of the (C3). Based on all of the second hard phases that are observed in the measurement visual field, the compositions of the second hard phases are measured, and the ratios (Nb ratios) of niobium to the sum of titanium and niobium in terms of the number of atoms are calculated. The Nb ratios are obtained in five measurement visual fields that do not overlap one another In the present specification, the average of the compositions of all of the second hard phases in the five measurement visual fields corresponds to the composition of all of the second hard phases in the cemented carbide. In the present specification, the average of the Nb ratios in the five measurement visual fields corresponds to the Nb ratio in the cemented carbide.

It was confirmed from the measurement on the same specimen by the applicant that, even when any cutting spot was set on the cross section of the cemented carbide, any captured region of the STEM-HAADF image was set on the sample, and the average of the Nb ratios in all of the second hard phases was measured a plurality of times according to the above-described procedure, a variation in the measurement result was small, and, even when any cutting spot was set on the cross section of the cemented carbide, and any captured region of the STEM-HAADF image was set, the measurement result was not arbitrary.

<<Average Particle Diameter>>

In Embodiment 1, the second hard phase has an average particle diameter of no more than 0.1 μm In such a case, the adhesion resistance of the cemented carbide is improved. In addition, the second hard phase is less likely to act as a starting point of fracture, and the breakage resistance of a tool containing the cemented carbide is improved. The lower limit of the average particle diameter of the second hard phase is preferably no less than 0.002 μm, no less than 0.01 μm, no less than 0.02 μm or no less than 0.03 μm. The upper limit of the average particle diameter of the second hard phase is no more than 0.1 μm, and is preferably no more than 0.00 µm, no more than 0.08 µm, no more than 0.07 µm or no more than 0.06 µm. The average particle diameter of the second hard phase is preferably no less than 0.01 µm and no more than 0.1 µm, no less than 0.02 µm and no more than 0.1 µm, no less than 0.03 µm and no more than 0.1 µm, no less than 0.01 µm and no more than 0.09 µm, no less than 0.02 µm and no more than 0.09 µm, no less than 0.03 µm and no more than 0.09 µm, no less than 0.01 µm and no more than 0.08 µm, no less than 0.02 µm and no more than 0.08 µm, no less than 0.03 µm and no more than 0.08 µm, no less than 0.01 µm and no more than 0.07 µm, no less than 0.02 µm and no more than 0.07 µm, no less than 0.03 µm and no more than 0.07 µm, no less than 0.01 µm and no more than 0.06 µm, no less than 0.02 µm and no more than 0.06 µm or no less than 0.03 µm and no more than 0.06 µm. In such a case, the tool service life is further improved.

In the present specification, the average particle diameter of the second hard phase means D50 (an equivalent circle diameter at which the cumulative number-based frequency reaches 50%, median diameter D50) of equal area equivalent circle diameters (Heywood diameters) of a plurality of crystal grains that are included in the second hard phase. A method for measuring the average particle diameter of the second hard phase is as described below.

(A3) A presence region of the second hard phase is specified on the binarized image by the same method as the (A1) to (F1) of the method for measuring the content of the first hard phase, the content of the second hard phase and the content of the binder phase in the cemented carbide.

(B3) One 24.9 µm×18.8 µm rectangular measurement visual field is set in the binarized image The outer edge of each second hard phase in the measurement visual field is specified using the image analysis software, and the equivalent circle diameter (Heywood diameter: equal area equivalent circle diameter) of each second hard phase is calculated.

(C3) Based on all of the second hard phases in the measurement visual field, D50 of the equal area equivalent circle diameters of the second hard phases is calculated.

It was confirmed from the measurement on the same specimen by the applicant that, even when any cutting spot was set on the cross section of the cemented carbide, any captured region that is described in the (C1) was set on the cross section, any measurement visual field that is described in the (B3) was set, and the average particle diameter of the tungsten carbide particles was measured a plurality of times according to the above-described procedure, a variation in the measurement results was small, and, even when any cutting spot was set on the cross section of the cemented carbide, any captured region on the captured image was set, and any measurement visual fields were set, the measurement results are not arbitrary.

<<Dispersity>>

In Embodiment 1, the second hard phase has a dispersity of no more than 0.7. In such a case, the structure of the cemented carbide becomes homogeneous, and the cemented carbide is capable of having excellent adhesion resistance The upper limit of the dispersity of the second hard phase is no more than 0.7, and is preferably no more than 0.70, no more than 0.69, no more than 0.68, no more than 0.65, no more than 0.60, no more than 0.55 or no more than 0.40 The lower limit of the dispersity of the second hard phase is not particularly limited, but is preferably, for example, no less than 0 or no less than 0.1. The dispersity of the second hard phase is preferably no less than 0 and no more than 0.7, no less than 0 and no more than 0.70, no less than 0 and no more than 0.69, no less than 0 and no more than 0.68, no less than 0 and no more than 0.65, no less than 0 and no more than 0.60, no less than 0 and no more than 0.55, no less than 0 and no more than 0.40, no less than 0.1 and no more than 0.7, no less than 0.1 and no more than 0.70, no less than 0.1 and no more than 0.69, no less than 0.1 and no more than 0.68, no less than 0.1 and no more than 0.65, no less than 0.1 and no more than 0.60, no less than 0.1 and no more than 0.55 or no less than 0.1 and no more than 0.40.

In the present specification, the dispersity or the second hard phase is measured using a Voronoi diagram. A specific measurement method is as described below.

(A4) A binarization treatment is performed on a backscattered electron image of a mirror-like finished surface of the cemented carbide by the same method as the (A1), (C1) and (E1) in the methods for measuring the content of the first hard phase, the content of the second hard phase and the content of the binder phase of the cemented carbide to obtain a binarized image on which only the second hard phase has been extracted.

(B4) One 24.9 µm×18.8 µm rectangular measurement region is set in the binarized image In the measurement region, the position of the center of gravity of each second hard phase is derived using the image processing software. The obtained coordinate of the center of gravity is regarded as a generator, a Voronoi partition is performed and Voronoi cells of all generators are derived to produce a Voronoi diagram. The Voronoi cell is a region surrounded by Voronoi boundaries that are each generated by partitioning a space between two adjacent generators with a perpendicular bisector when a plurality of generators is disposed on the same plane.

Figure 4:
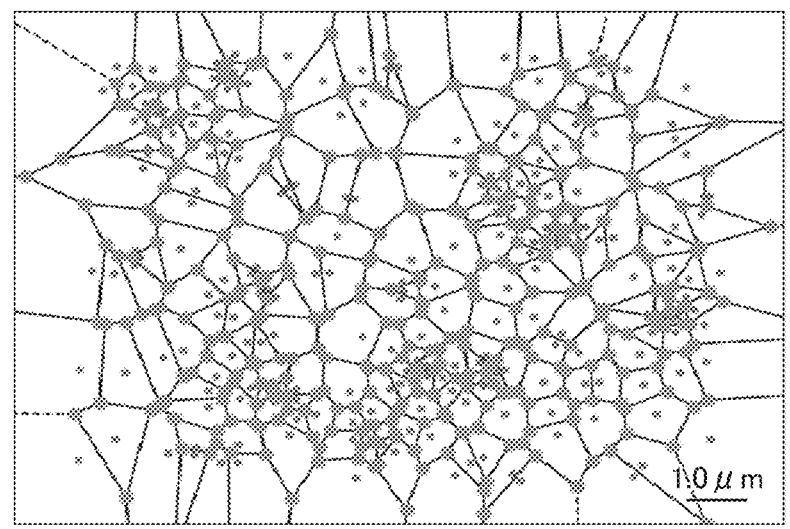
FIG. 4 is a Voronoi diagram produced based on the backscattered electron image shown in FIG. 1.

A Voronoi diagram produced based on the backscattered electron image shown in FIG. 1 is shown in FIG. 4. In FIG. 4, small black circles indicate the centers of gravity of the second hard phases, line segments indicate perpendicular bisectors between two adjacent generators, and regions surrounded by the perpendicular bisectors indicate Voronoi cells.

(C4) For all of the Voronoi cells in the measurement region, the Voronoi area ($\mu m^2$) of each cell is derived using the image processing software Here, the Voronoi cell in the measurement region means a Voronoi cell that is fully present in the measurement region. Therefore, when a part of a Voronoi cell is present outside the measurement region, the Voronoi cell is not regarded as a Voronoi cell in the measurement region.

A standard deviation σ of all of the Voronoi areas in the measurement region is derived. In the present specification, the standard deviation σ is derived.

(D4) The standard deviation σ is derived in five measurement regions that do not overlap one another. In the present specification, the average of the standard deviations σ in the five measurement regions corresponds to the dispersity of the second hard phase in the cemented carbide.

It was confirmed from the measurement on the same specimen by the applicant that, even when any cutting spot was set on the cross section of the cemented carbide, any measurement region described in the (B4) was set on the sample, and the dispersity of the second hard phase was measured a plurality of times according to the above-described procedure, a variation in the measurement result was small, and, even when any cutting spot was set on the cross section of the cemented carbide, and any captured region of the captured image was set, the measurement result was not arbitrary.

<Binder Phase>
<<Composition>>

In Embodiment 1, the binder phase contains at least one first element selected from the group consisting of iron, cobalt and nickel. The content of the first element in the binder phase (in a case where the first element is composed of two or more elements, the total content thereof) is preferably no less than 90 mass % and no more than 100 mass %, no less than 95 mass % and no more than 100 mass %, no less than 98 mass % and no more than 100 mass % or 100 mass %. The content of the first element in the binder phase is measured by ICP emission spectroscopy.

The binder phase may contain, in addition to the first element, tungsten (W), chromium (Cr), vanadium (V), titanium (Ti), niobium (Nb), tantalum (Ta) or the like.

<Manufacturing Method>

The cemented carbide of Embodiment 1 can be produced by, for example, the following method. Raw material powders are prepared. As raw materials of the first hard phase and the second hard phase, a tungsten carbide (WC) powder, a tungsten trioxide ($WO_3$) powder, a titanium oxide ($TiO_2$) powder and a niobium oxide ($Nb_2O_5$) powder are prepared. The use of the tungsten trioxide ($WO_3$) powder makes it possible to make WC particles in the cemented carbide fine. Examples of a raw material of the binder phase include an iron (Fe) powder, a cobalt (Cu) powder and a nickel (Ni) powder. Examples of a grain growth inhibitor include a chromium carbide ($Cr_3C_2$) powder and a vanadium carbide (VC) powder.

The average particle diameter of the tungsten carbide (WC) powder can be set to no less than 0.1 μm and no more than 3.5 μm. The average particle diameter of the WC powder is measured by the Fischer method or the BET method.

The average particle diameter of the tungsten trioxide ($WO_3$) powder can be set to no less than 0.1 μm and no more than 3 gnu. The average particle diameter of the titanium oxide ($TiO_2$) powder can be set to no less than 0.001 μm and no more than 1 μm The average particle diameter of the niobium oxide ($Nb_2O_5$) powder can be set to no less than 0.001 μm and no more than 1 μm. The average particle diameter of the iron (Fe) powder can be set to no less than 0.1 μm and no more than 5 μm. The average particle diameter of the cobalt (Co) powder can be set to no less than 0.1 μm and no more than 5 μm. The average particle diameter of the nickel (Ni) powder can be set to no less than 0.1 μm and no more than 5 μm. The average particle diameter of the raw material powder means the number-based median diameter d50 of the sphere equivalent diameters of the raw material powders. The average particle diameter of the raw material powder is measured using a particle size distribution measuring instrument (trade name MT3300EX) manufactured by MicrotracBEL Corp.

Next, the raw material powders are mixed together to obtain a powder mixture. An attritor or a ball mill can be used for the mixing. The mixing time in the attritor can be set to no shorter than three hours and no longer than 20 hours. The mixing time in the ball mill can be set to no shorter than three hours and no longer than 72 hours.

Next, the powder mixture is molded into a desired shape to afford a compact. A molding method and molding conditions do not particularly matter as long as ordinary method and conditions are adopted Next, the compact is put into a sintering furnace, and the temperature is raised up to 1200° C. in a vacuum Subsequently, the temperature is raised from 1200° C. up to 1350° C. in a $N_2$ gas atmosphere at a pressure of 8 to 40 kPa Subsequently, the compact is sintered by being held in the $N_2$ gas atmosphere at a pressure of 12 to 40 kPa and 1350° C. for 30 to 60 minutes Next, a sinter hot isostatic pressing (s-HIP) treatment is performed on the sintered body. For example, a temperature of 1330° C. to 1365° C. and a pressure of 3 to 10 MPa are applied to the sintered body for 60 minutes using an Ar gas as a pressure medium.

Next, the sintered body after the s-HIP treatment is quenched to room temperature in an Ar gas at a pressure of 400 kPaG to afford a cemented carbide.

Embodiment 2: Cemented Carbide (2)

A cemented carbide of an embodiment of the present disclosure (hereinafter, also referred to as "Embodiment 2") is a cemented carbide composed of a first hard phase, a third hard phase and a binder phase.
  in which the first hard phase is composed of tungsten carbide particles,
  the third hard phase is composed of at least one second compound selected from the group consisting of TiTaC, TiTaN and TiTaCN,
  the third hard phase has an average particle diameter of no more than 0.1 μm.
  the third hard phase has a dispersity of no more than 0.7,
  a content of the third hard phase is no less than 0.1 vol % and no more than 15 vol %,
  the binder phase contains at least one first element selected from the group consisting of iron, cobalt and nickel, and
  the content of the binder phase is no less than 0.1 vol % and no more than 20 vol %.

The cemented carbide of Embodiment 2 can be configured in the same manner as the cemented carbide of Embodiment 1 except that the second hard phase of the cemented carbide of Embodiment 1 is changed to the third hard phase. Hereinafter, the third hard phase and a manufacturing method will be described.

<Third lard Phase>
<<Composition>>

In Embodiment 1, the third hard phase is composed of at least one second compound selected from the group consisting of TiTaC, TiTaN and TiTaCN. In such a case, the adhesion resistance of the cemented carbide is improved.

The third hard phase is not limited to pure TiTaC, TiTaN and TiTaCN and may contain, a metallic element such as tungsten (W), chromium (Cr) or cobalt (Co) to an extent that the effect of the present disclosure is not impaired The total content of W, Cr and Co in the third hard phase is preferably no less than 0 mass % and less than 0.1 mass %. The content of W, Cr and Co in the third hard phase is measured by ICP emission spectroscopy.

The third hard phase is preferably composed of a plurality of crystal grains. Examples of the crystal grains that are included in the third hard phase include TiTaC particles, TiTaN particles, TiTaCN particles and particles composed of two or more second compounds selected from the group consisting of TiTaC, TiTaN and TiTaCN.

The third hard phase may be composed of crystal grains all having the same composition For example, the third hard phase may be composed of TiTaC particles. The third hard phase may be composed of TiTaN particles. The third hard phase may be composed of TiTaCN particles The third hard phase may be composed of particles made of two or more second compounds selected from the group consisting of TiTaC, TiTaN and TiTaCN.

The third hard phase may be composed of crystal grains having two or more different compositions. For example, the third hard phase may be composed of two or more kinds of crystal grains selected from the group consisting of TiTaC particles. TiTaN particles. TiTaCN particles and particles made of two or more second compounds selected from the group consisting of TiTaC, TiTaN and TiTaCN. The third hard phase may be composed of TiTaC particles, TiTaN particles and TiTaCN particles A method for measuring the composition of the third hard phase can be performed according to the method for measuring the composition of the second hard phase described in Embodiment 1 and thus will not be described repeatedly.

Figure 5:
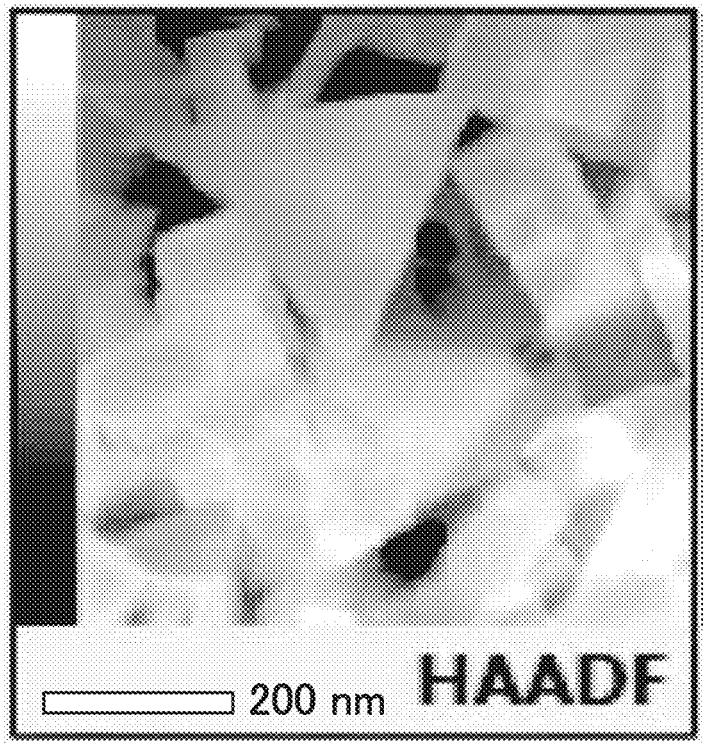
FIG. 5 is an example of STEM-HAADF image of a cemented carbide of Embodiment 2.
Figure 6:
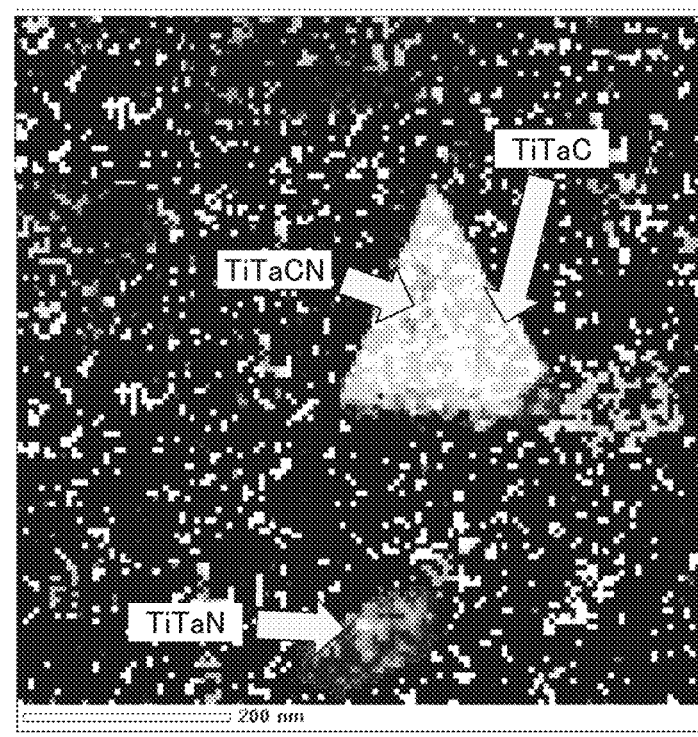
FIG. 6 is an element mapping image of the cemented carbide of Embodiment 2.

FIG. 5 is an example of a STEM-HAADF image of the cemented carbide of Embodiment 2. FIG. 6 is an element mapping image of the cemented carbide of Embodiment 2 in the same measurement visual field in FIG. 5. In the slightly right part from the center in FIG. 6, one third hard phase (crystal grains) composed of TiTaC and TiTaCN is confirmed. In the lower part of FIG. 6, one third hard phase (crystal grains) composed of TiTaN is confirmed.

It was confirmed from the measurement on the same specimen by the applicant that, even when any cutting spot was set on the cross section of the cemented carbide, any captured region of the STEM-HAADF image was set on the sample, and the composition attic third hard phase was measured a plurality of times according to the method for measuring the composition of the second hard phase described in Embodiment 1, a variation in the measurement result was small, and, even when any cutting spot was set on the cross section of the cemented carbide, and any captured region of the STEM-HAADF image was set, the measurement result was not arbitrary.

In the third hard phase, the lower limit of the ratio of tantalum to the sum of titanium and tantalum in terms of the number of atoms (hereinafter, also referred to as "Ta ratio") may be set to no less than 0.03, no less than 0.04 or no less than 0.05. The upper limit of the Ta ratio may be set to no more than 0.48, no more than 0.46, no more than 0.44 or no more than 042. The Ta ratio may be set to no less than 0.03 and no more than 0.48, no less than 0.04 and no more than 0.48, no less than 0.05 and no more than 0.48, no less than 0.03 and no more than 0.46, no less than 0.04 and no more than 0.46, no less than 0.05 and no more than 0.46, no less than 0.03 and no more than 0.44, no less than 0.04 and no more than 0.44, no less than 0.05 and no more than 0.44, no less than 0.03 and no more than 0.42, no less than 0.04 and no more than 0.42 or no less than 0.05 and no more than 0.42. In such a case, the second hard phase can be finely dispersed in the cemented carbide, and the adhesion resistance of the cemented carbide is improved.

In the present specification, the ratio of tantalum to the sum of titanium and tantalum in terms of the number of atoms in the third hard phase means the average of the ratios (Ta ratios) of tantalum to the sum of titanium and tantalum in terms of the number of atoms in the third hard phases that are included in the cemented carbide. The Ta ratio is obtained by the following procedure. A 24.9 μm×18.8 μm rectangular measurement visual field is set in the element mapping image of the (C3). Based on all of the third hard phases that are observed in the measurement visual field, the compositions of the third hard phases are measured, and the ratios (Ta ratios) of tantalum to the sum of titanium and tantalum in terms of the number of atoms are calculated The Ta ratios are obtained in five measurement visual fields that do not overlap one another. In the present specification, the average of the compositions of all of the third hard phases in the five measurement visual fields corresponds to the composition of all of the third hard phases in the cemented carbide. In the present specification, the average of the Ta ratios in the five measurement visual fields corresponds to the Ta ratio in the cemented carbide.

It was confirmed from the measurement on the same specimen by the applicant that, even when an cutting spot was set on the cross section of the cemented carbide, any captured region of the STEM-HAADF image was set on the sample, and the average of the Ta ratios in all of the third hard phases was measured a plurality of times according to the above-described procedure, a variation in the measurement result was small, and, even when any cutting spot was set on the cross section of the cemented carbide, and any captured region of the SEEM-HAADF image was set, the measurement result was not arbitrary.

<Manufacturing Method>

A method for manufacturing the cemented carbide of Embodiment 2 can be the same as the method for manufacturing the cemented carbide of Embodiment 1 except that, in the method for manufacturing the cemented carbide of Embodiment 1, as the raw material powder, the niobium oxide ($Nb_2O_5$) powder is changed to a tantalum oxide ($Ta_2O_5$) powder.

Embodiment 3: Tool

A tool of one embodiment of the present disclosure (hereinafter, also referred to as "Embodiment 3") is a cutting tool containing the cemented carbide described in Embodiment 1 or Embodiment 2 The tool is also capable of having excellent adhesion resistance in addition to the mechanical strength that the cemented carbide intrinsically has. The tool preferably contains the cemented carbide of Embodiment 1 or Embodiment 2 at least in a part that is involved in cutting. The part that is involved in cutting means a region that is no more than μm distant from the blade edge.

As the tool, a drill, a micro drill, an end mill, a blade edge-replaceable cutting tip for a drill, a blade edge-replaceable cutting tip for an end mill, a throw-away tip for milling, a throw-away tip for turning, a metal saw, a gear cutting tool, a reamer, a tap, a cutting tool, a wear-resistant tool, a tool for friction stir welding and the like can be exemplified.

[Addendum 1]

In the cemented carbide of Embodiment 2, in a 24.9 μm×18.8 μm rectangular measurement visual field set in an image after a binarization treatment of a backscattered electron image that is obtained by capturing a cross section of the cemented carbide with a scanning electron microscope, the number of the third hard phases is preferably no less than 30. In such a case, the adhesion resistance of the cemented carbide is improved.

[Addendum 2]

The third hard phase preferably has an average particle diameter of no less than 0.01 μm and no more than 0.08 μm. In such a case, the adhesion resistance of the cemented carbide is improved.

[Addendum 3]

The third hard phase preferably has a dispersity of no more than 0.4. In such a case, the adhesion resistance of the cemented carbide is improved

EXAMPLES

The present embodiments will be more specifically described using Examples. However, the present embodiments are not limited to these Examples.

[Production of Cemented Carbide]

<Specimen 1 to Specimen 37 and Specimen 1-1 to Specimen 1-15>

As raw materials, tungsten carbide (WC) powders, a tungsten trioxide ($WO_3$) powder, a chromium carbide ($Cr_3C_2$) powder, a titanium oxide ($TiO_2$) powder, a niobium oxide ($Nb_2O_5$) powder, a tantalum oxide ($Ta_2O_5$) powder, a cobalt (Co) powder and a nickel (Ni) powder were prepared.

As the WC powders, a tungsten carbide powder "WC02NR" (average particle diameter: 0.10 to 0.14 µm, equivalent particle diameter by the BET methyl). "WC04NR" (average particle diameter: 0.45 to 0.49 µm, average particle diameter by the Fischer method) and "WC25S" (average particle diameter 2.4 to 3.2 µm, measured using a particle size distribution measuring instrument (trade name: MT3300EX) manufactured by MicrotracBEL Corp.), all of which were manufactured by A.L.M.T. Corp. were used.

The average particle diameter of the $WO_3$ powder is 1.5 µm, the average particle diameter of the $Cr_3C_2$ powder is 1.5 µm, the average particle diameter of the $TiO_2$ powder is 0.01 µm, the average particle diameter of the $Nb_2O_5$ powder is 0.05 µm, the average particle diameter of the $Ta_2O_5$ powder is 0.05 µm, the average particle diameter of the Co powder is 1 µm, and the average particle diameter of the Ni powder is 1 µm The average particle diameters of the raw material powders are values measured using the particle size distribution measuring instrument (trade name: MT3300EX) manufactured by MicrotracBEL Corp.

The raw material powders were mixed at proportions shown in the "raw material powders" column of Table 1 to Table 3 to afford powder mixtures. For example, in Specimen 1, 100 mass % of the powder mixture contains 52.0 mass % of the WC powder (WC04NR). 34.7 mass % of the $WO_3$ powder, 1.0 mass % of the $Cr_3C_2$ powder, 0.27 mass % of the $TiO_2$ powder, 0.07 mass % of the $Nb_2O_5$ powder and 12.0 mass % of the Co powder. For the mixing, an author was used. The inking time in the attritor is 10 hours.

The obtained powder mixtures were molded by pressing to afford compacts having a round bar shape with a diameter of ɸ3.5 mm.

For specimens other than Specimen 1-1, sintered bodies were afforded by the following method. The compacts were put into a sintering furnace, and the temperature was raised up to 1200° C. in a vacuum. The temperature rise rate was set to 10° C./minute. Subsequently, the temperature was raised from 1200° C. up to 1350° C. in a $N_2$ gas atmosphere at pressures shown in the "pressure" columns for "step 1" in Table 1 to Table 3 Subsequently, the compacts were sintered by being held in the $N_2$ gas atmosphere at pressures shown in the "pressure" columns for "step 2" in Table 1 to Table 3 at a temperature of 1350° C. for times shown in the "time" columns for "step 2" to afford sintered bodies. For example, for Specimen 1, the temperature was raised up to 1200° C. in a vacuum Subsequently, the temperature was raised from 1200° C. up to 1350° C. in a $N_2$ gas atmosphere at a pressure of 40 kPa Subsequently, the compact was sintered by being held in the $N_2$ gas atmosphere at a pressure of 12 kPa and a temperature of 1350° C. for 30 minutes to afford a sintered body For Specimen 1-1, a sintered body was afforded by the following method. The compact was put into a sintering furnace, and the temperature was raised up to 1200° C. in a vacuum. The temperature rise rate was set to 10° C./minute. Subsequently, the temperature was raised from 1200° C. up to 1350° C. in a vacuum (expressed as "sac sintering" in Table 3). Subsequently, the compact was sintered by being held in the vacuum at a temperature of 1350° C. for the time shown in the "time" column for "step 2" (expressed as "vac sintering" in Table 3) to afford a sintered body.

On the obtained sintered bodies, s-HIP treatments were performed. Specifically, temperatures and pressures shown in the "temperature" and "pressure" columns for "s-HIP" step in Table 1 to Table 3 were applied to the sintered bodies for 60 minutes using an At gas as a pressure medium. For example, for Specimen 1, 1350° C. and a pressure of 7 MPaG were applied for 60 minutes using an Ar gas as the pressure medium. Subsequently, the sintered body after the s-HIP treatment was quenched to room temperature in the Ar gas at a pressure of 400 kPaG to afford a cemented carbide.

<Specimen 1-13>

A cemented carbide was produced by the same method as for Specimen No. 5 of Examples of PTL 2 (Japanese Patent Laying-Open No. 2012-251242).

<Specimen 1-14>

A cemented carbide was produced by the same method as for Example 1 of PTL 4 (Japanese Patent laying-Open No. 2016-98393).

[Production of Tools]

Round bars made of the obtained cemented carbides were processed to produce end mills having a diameter of ɸ3.0 mm.

TABLE 1

| Specimen No | Raw material powder (mass %) | | | | | | | | | | Step 1 | Step 2 | | s-HIP step | |
|---|---|---|---|---|---|---|---|---|---|---|---|---|---|---|---|
| | WC04 NR | WC02 NR | WC25S | $WO_3$ | $Cr_3C_2$ | $TiO_2$ | $Nb_2O_5$ | $Ta_2O_5$ | Co | Ni | Pressure (kPa) | Pressure (kPa) | Time (min) | Pressure (MPa) | Temperature (° C.) |
| 1 | 52.00 | — | — | 34.66 | 1.00 | 0.27 | 0.07 | — | 12.00 | — | 40 | 12 | 30 | 7 | 1350 |
| 2 | 52.09 | — | — | 34.72 | 1.00 | 0.15 | 0.04 | — | 12.00 | — | 12 | 40 | 60 | 7 | 1350 |
| 3 | 52.00 | — | — | 34.67 | 1.00 | 0.28 | 0.06 | — | 12.00 | — | 8 | 12 | 60 | 7 | 1350 |
| 4 | 51.00 | — | — | 34.00 | 1.00 | 1.84 | 0.16 | — | 12.00 | — | 12 | 12 | 60 | 7 | 1330 |
| 5 | 51.46 | — | — | 34.31 | 1.00 | 1.17 | 0.06 | — | 12.00 | — | 12 | 12 | 60 | 7 | 1365 |
| 6 | 51.52 | — | — | 34.34 | 1.00 | 0.76 | 0.38 | — | 12.00 | — | 12 | 12 | 60 | 10 | 1350 |
| 7 | 51.27 | — | — | 34.18 | 1.00 | 0.98 | 0.57 | — | 12.00 | — | 12 | 12 | 60 | 3 | 1350 |
| 8 | 52.18 | — | — | 34.79 | 1.00 | 0.02 | 0.01 | — | 12.00 | — | 12 | 12 | 60 | 7 | 1350 |
| 9 | 50.62 | — | — | 33.74 | 1.00 | 1.98 | 0.66 | — | — | 12.00 | 12 | 12 | 60 | 7 | 1350 |
| 10 | — | 51.90 | — | 34.60 | 1.00 | 0.38 | 0.13 | — | 12.00 | — | 12 | 12 | 60 | 7 | 1350 |
| 11 | — | — | 52.65 | 35.10 | — | 0.19 | 0.06 | — | 12.00 | — | 12 | 12 | 60 | 7 | 1350 |
| 12 | 51.75 | — | — | 34.50 | 1.00 | 0.73 | 0.02 | — | 12.00 | — | 12 | 12 | 60 | 7 | 1350 |
| 13 | 51.71 | — | — | 34.47 | 1.00 | 0.44 | 0.38 | — | 12.00 | — | 12 | 12 | 60 | 7 | 1350 |

TABLE 1-continued

| Specimen No | Raw material powder (mass %) | | | | | | | | | | Step 1 Pressure (kPa) | Step 2 Pressure (kPa) | Time (min) | s-HIP step Pressure (MPa) | Temperature (° C.) |
|---|---|---|---|---|---|---|---|---|---|---|---|---|---|---|---|
| | WC04 NR | WC02 NR | WC25S | WO$_3$ | Cr$_3$C$_2$ | TiO$_2$ | Nb$_2$O$_5$ | Ta$_2$O$_5$ | Co | Ni | | | | | |
| 14 | 52.00 | — | — | 34.66 | 1.00 | 0.27 | 0.07 | — | 12.00 | — | 40 | 12 | 30 | 7 | 1350 |
| 15 | 52.18 | — | — | 34.79 | 1.00 | 0.02 | 0.01 | — | 12.00 | — | 12 | 12 | 60 | 7 | 1350 |
| 16 | 51.00 | — | — | 34.00 | 1.00 | 1.84 | 0.16 | — | 0.10 | — | 12 | 12 | 60 | 7 | 1330 |
| 17 | 51.00 | — | — | 34.00 | 1.00 | 1.84 | 0.16 | — | 12.30 | — | 12 | 12 | 60 | 7 | 1330 |
| 18 | 51.90 | — | — | 34.60 | 1.00 | 0.40 | — | 0.09 | 12.00 | — | 12 | 12 | 60 | 7 | 1350 |
| 19 | 51.89 | — | — | 34.59 | 1.00 | 0.46 | — | 0.06 | 12.00 | — | 12 | 40 | 60 | 7 | 1350 |

TABLE 2

| Specimen No | Raw material powder (mass %) | | | | | | | | | | Step 1 Pressure (kPa) | Step 2 Pressure (kPa) | Time (min) | s-HIP step Pressure (MPa) | Temperature (° C.) |
|---|---|---|---|---|---|---|---|---|---|---|---|---|---|---|---|
| | WC04 NR | WC02 NR | WC25S | WO$_3$ | Cr$_3$C$_7$ | TiO$_2$ | Nb$_2$O$_5$ | Ta$_2$O$_5$ | Co | Ni | | | | | |
| 20 | 51.80 | — | — | 34.54 | 1.00 | 0.56 | — | 0.10 | 12.00 | — | 8 | 12 | 60 | 7 | 1350 |
| 21 | 51.95 | — | — | 34.63 | 1.00 | 0.34 | — | 0.07 | 12.00 | — | 12 | 12 | 60 | 7 | 1330 |
| 22 | 51.89 | — | — | 34.60 | 1.00 | 0.43 | — | 0.08 | 12.00 | — | 12 | 12 | 60 | 7 | 1365 |
| 23 | 51.92 | — | — | 34.61 | 1.00 | 0.42 | — | 0.05 | 12.00 | — | 12 | 12 | 60 | 10 | 1350 |
| 24 | 51.88 | — | — | 34.59 | 1.00 | 0.48 | — | 0.05 | 12.00 | — | 12 | 12 | 60 | 3 | 1350 |
| 25 | 52.17 | — | — | 34.78 | 1.00 | 0.04 | — | 0.01 | 12.00 | — | 12 | 12 | 60 | 7 | 1350 |
| 26 | 51.32 | — | — | 34.21 | 1.00 | 1.02 | — | 0.44 | — | 12.00 | 12 | 12 | 60 | 7 | 1350 |
| 27 | — | 51.62 | — | 34.41 | 1.00 | 0.64 | — | 0.33 | 12.00 | — | 12 | 12 | 60 | 7 | 1350 |
| 28 | — | — | 52.15 | 34.76 | 0.00 | 0.65 | — | 0.44 | 12.00 | — | 12 | 12 | 60 | 7 | 1350 |
| 29 | 51.81 | — | — | 34.54 | 1.00 | 0.62 | — | 0.03 | 12.00 | — | 12 | 12 | 60 | 7 | 1350 |
| 30 | 51.90 | — | — | 34.60 | 1.00 | 0.26 | — | 0.24 | 12.00 | — | 12 | 12 | 60 | 7 | 1350 |
| 31 | 59.09 | — | — | 39.39 | 1.00 | 0.34 | — | 0.07 | 0.10 | — | 12 | 12 | 60 | 7 | 1330 |
| 32 | 51.77 | — | — | 34.51 | 1.00 | 0.34 | — | 0.07 | 12.30 | — | 12 | 12 | 60 | 7 | 1330 |
| 33 | 51.90 | — | — | 34.60 | 1.00 | 0.40 | 0.09 | — | 12.00 | — | 12 | 12 | 60 | 7 | 1350 |
| 34 | 51.90 | — | — | 34.60 | 1.00 | 0.40 | — | 0.09 | 12.00 | — | 12 | 12 | 60 | 7 | 1350 |
| 35 | 51.92 | — | — | 34.61 | 1.00 | 0.39 | — | 0.09 | 12.00 | — | 12 | 12 | 60 | 7 | 1350 |
| 36 | 51.90 | — | — | 34.60 | 1.00 | 0.43 | — | 0.07 | 12.00 | — | 12 | 12 | 60 | 7 | 1350 |
| 37 | 51.90 | — | — | 34.60 | 1.00 | 0.43 | — | 0.07 | 12.00 | — | 12 | 12 | 60 | 7 | 1350 |

TABLE 3

| Specimen No | Raw material powder (mass %) | | | | | | | | | | Step 1 Pressure (kPa) | Step 2 Pressure (kPa) | Time (min) | s-HIP step Pressure (MPa) | Temperature (° C.) |
|---|---|---|---|---|---|---|---|---|---|---|---|---|---|---|---|
| | WC04 NR | WC02 NR | WC25S | WO$_3$ | Cr$_3$C$_2$ | TiO$_2$ | Nb$_2$O$_5$ | Ta$_2$O$_5$ | Co | Ni | | | | | |
| 1-1 | 51.88 | — | — | 34.59 | 1.00 | 0.43 | 0.11 | — | 12.00 | — | vac sintering | vac sintering | 60 | 7 | 1350 |
| 1-2 | 51.71 | — | — | 34.48 | 1.00 | 0.58 | 0.23 | — | 12.00 | — | 1 | 1 | 60 | 7 | 1350 |
| 1-3 | 51.19 | — | — | 34.13 | 1.00 | 1.17 | 0.50 | — | 12.00 | — | 12 | 12 | 60 | 7 | 1350 |
| 1-4 | 52.18 | — | — | 34.79 | 1.00 | 0.02 | 0.01 | — | 12.00 | — | 12 | 12 | 60 | 7 | 1350 |
| 1-5 | 59.10 | — | — | 39.40 | 1.00 | 0.40 | 0.10 | — | — | — | 12 | 12 | 60 | 7 | 1350 |
| 1-6 | 51.23 | — | — | 34.16 | 1.00 | 0.52 | 0.09 | — | 13.00 | — | 12 | 12 | 60 | 7 | 1350 |
| 1-7 | 51.89 | — | — | 34.60 | 1.00 | 0.42 | — | 0.09 | 12.00 | — | 12 | 12 | 60 | 7 | 1350 |
| 1-8 | 51.93 | — | — | 34.62 | 1.00 | 0.37 | — | 0.09 | 12.00 | — | 12 | 12 | 60 | 7 | 1350 |
| 1-9 | 51.31 | — | — | 34.21 | 1.00 | 1.38 | — | 0.11 | 12.00 | — | 12 | 12 | 60 | 7 | 1350 |
| 1-10 | 52.00 | — | — | 34.67 | 1.00 | 0.02 | — | 0.30 | 12.00 | — | 12 | 12 | 60 | 7 | 1350 |
| 1-11 | 59.19 | — | — | 39.46 | 1.00 | 0.34 | — | 0.01 | — | — | 12 | 12 | 60 | 7 | 1350 |
| 1-12 | 51.37 | — | — | 34.24 | 1.00 | 0.32 | — | 0.07 | 13.00 | — | 12 | 12 | 60 | 7 | 1350 |
| 1-13 | Conditions described in patent | | | — | | TiNbCN 5 vol % | | | 10.00 | — | Conditions described in patent | | | | |
| 1-14 | Conditions described in patent | | | — | | 1.10 | | — | 10.00 | — | Conditions described in patent | | | | |
| 1-15 | 51.90 | — | — | 34.60 | 1.00 | 0.40 | — | 0.09 | 12.00 | — | 12 | 12 | 60 | 7 | 1350 |

[Evaluation]

<Cemented Carbide>

<<Composition of Cemented Carbide>>

For the cemented carbide of each specimen, the contents (vol %) of the first hard phase, the second hard phase, or the third hard phase and the binder phase were measured. A specific measurement method is as described in Embodiment 1. The results are shown in the "vol %" columns for "first hard phase", the "vol %" columns for "second hard phase/third hard phase" and the "vol %" columns for "binder phase" for "cemented carbide" in Table 4 to Table 6.

<<Average Particle Diameter of Tungsten Carbide Particles>>

For the cemented carbide of each specimen, the average particle diameter of tungsten carbide particles in the first hard phase was measured. A specific measurement method is as described in Embodiment 1. The results are shown in the "average particle diameter (μm)" columns for "first hard phase" in Table 4 to Table 6.

<<Composition of Second Hard Phase or Third Hard Phase>>

For the cemented carbide of each specimen, the composition of the second hard phase or the third hard phase was measured. A specific measurement method is as described in Embodiment 1. The results are shown in the "composition" columns for "second hard phase/third hard phase" in Table 4 to Table 6.

When "TiNbC, TiNbN, TiNbCN" is shown in the "composition" column, it is indicated that the cemented carbide includes the second hard phase and the second hard phase includes TiNbC particles, TiNbN particles, TiNbCN particles and two or more kinds of first compounds selected from the group consisting of TiNbC, TiNbN and TiNbCN. When "TiNbC" is shown in the "composition" column, it is indicated that the second hard phase is composed of TiNbC particles.

When "TiTaC, TiTaN, TiTaCN" is shown in the "composition" column, it is indicated that the cemented carbide includes the third hard phase and the third hard phase includes TiTaC particles, TiTaN particles, TiTaCN particles and two or more kinds of second compounds selected from the group consisting of TiTaC, TiTaN and TiTaCN. When "TiTaC" is shown in the "composition" column, it is indicated that the third hard phase is composed of TiTaC particles.

"-" in the "composition" column indicates that neither the second hard phase nor the third hard phase is present.

<<Nb Ratio and Ta Ratio>>

For the cemented carbide of each specimen, the ratio of niobium to the sum of titanium and niobium in teams of the number of atoms in the second hard phase (Nb ratio) or the ratio of tantalum to the sum of titanium and tantalum in terms of the number of atoms in the third hard phase (Ta ratio) were derived based on the composition measured above. The results are shown in the "Nb ratio/Ta ratio" columns for "second hard phaser/third hard phase" in Table 4 to Table 6.

<<Average Particle Diameter of Second Hard Phase or Third Hard Phase>>

For the cemented carbide of each specimen, the average particle diameter of the second hard phase or the third hard phase was measured. A specific measurement method is as described in Embodiment 1 The results are shown in the "average particle diameter (μm)" columns for "second hard phase/third hard phase" in Table 4 to Table 6.

<<Dispersity of Second Hard Phase or Third Hard Phase>>

For the cemented carbide of each specimen, the dispersity of the second hard phase or the third hard phase was measured. A specific measurement method is as described in Embodiment 1. The results are shown in the "dispersity" columns for "second hard phase/third hard phase" in Table 4 to Table 6.

<<Number of Second Hard Phases or Third Hard Phases>>

For the cemented carbide of each specimen, the number of the second hard phases or the third hard phases in a 24.9 μm×18.8 μm rectangular measurement visual field was measured. A specific measurement method is as described in Embodiment 1. The results are shown in the "number" columns for "second hard phase/third hard phase" in Table 4 to Table 6.

<Tool>

<<Adhesion Resistance Test>>

The side surface of a 64 titanium alloy (Ti-6Al-4V) was processed using the end mill of each specimen. Regarding the processing conditions, the cutting velocity Vc was set to 150 m/min, the table feed F was set to 0.1 mm/min, the depth of cut (axial direction) ap was set to 2.0 mm, and the width of cut (radial direction) ae was set to 0.5 mm. Three end mills were processed The processing conditions correspond to the high-efficiency processing of a difficult-to-cut material.

Figure 7:
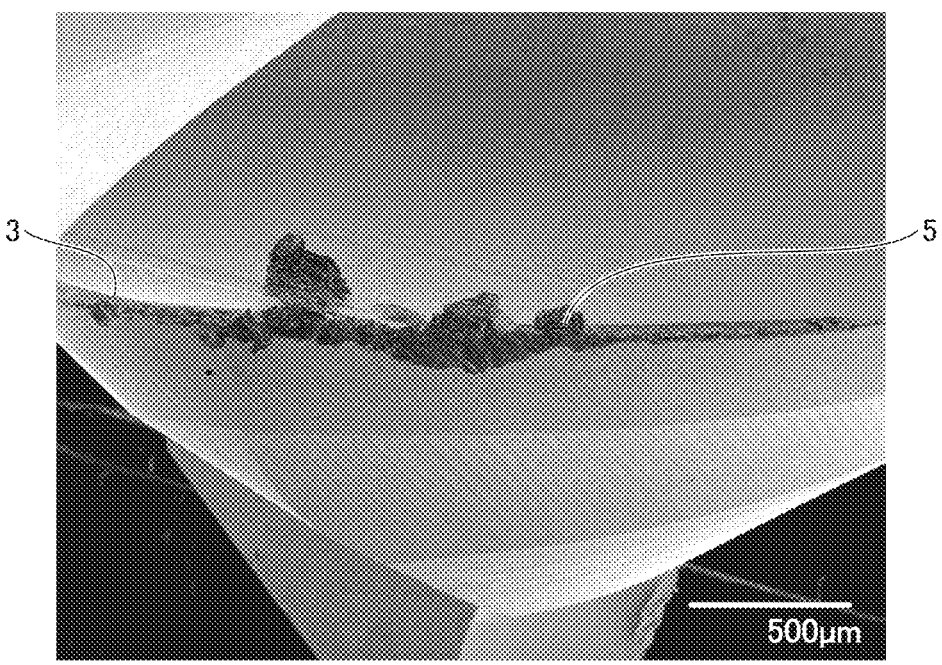
FIG. 7 is a photograph substitute showing an accretion on a cemented carbide.

When the length of cut reached 180 m, the blade edge of the end mill was observed with a scanning electron microscope, and the area of the blade edge to which a deposit was attached was measured by image analysis. Specifically, the area was measured by the following procedure The blade edge of the end mill is captured with a scanning electron microscope (SEM) in a rake face direction to obtain a backscattered electron image. The observation magnification is 5000 times. The measurement conditions are an accelerating voltage of 3 kV, a current value of 2 nA and a working distance (WD) of 5 mm. An example of the backscattered electron image is shown in FIG. 7. In FIG. 7, a dark dray region indicated by the reference signal 5, which is attached to a blade edge 3, is a deposit.

The captured region with the SEM is analyzed using SEM-EDX, titanium mapping is performed on the captured region, and the component of the deposit is identified. The area ($mm^2$) of the blade edge to which the deposit has been attached is measured using image analysis software (OpenCV, SciPy)

The average values of the areas of the blade edges to which the deposit has been attached in the three end mills are shown in the "adhesion resistance" column for "tool" in Tables 4 to Table 6. It is indicated that, as the area becomes smaller, the adhesion resistance becomes superior The expression "30 m, defect" in the "adhesion resistance" column indicates that a defect was caused in the tool when the tool was cut 30 m.

<<Wear Resistance Test>>

A cutting test was performed using the end mill of each specimen under the same conditions as for the above-described adhesion resistance test. The length of cut was measured when the wear loss of the flank face reached 0.2 mm. The average values of the lengths of cut in the three end mills are shown in the "tool service life" columns for "tool" in Table 4 to Table 6. It is indicated that, as the length of cut becomes longer, the tool service life becomes longer

TABLE 4

| | Cemented carbide | | | | | | | | | Tool | |
|---|---|---|---|---|---|---|---|---|---|---|---|
| | First hard phase | Second hard phase/third hard phase | | | | | | Binder phase | | Cutting test | |
| Specimen No. | Vol % | Average particle diameter (μm) | Vol % | Composition | Nb ratio/Ta ratio | Average particle diameter (μm) | Dispersity | Number | Vol % | Composition | Adhesion resistance | Tool service life (m) |
| 1 | 79.6 | 0.52 | 1.3 | TiNbC, TiNbN, TiNbCN | 0.20 | 0.002 | 0.33 | 132 | 19.1 | Co | 0.03 | 250 |
| 2 | 80.1 | 0.48 | 0.8 | TiNbC, TiNbN, TiNbCN | 0.23 | 0.100 | 0.29 | 41 | 19.1 | Co | 0.02 | 230 |
| 3 | 79.4 | 0.53 | 1.5 | TiNbC, TiNbN, TiNbCN | 0.17 | 0.080 | 0.28 | 42 | 19.1 | Co | 0.03 | 240 |
| 4 | 69.9 | 0.48 | 11.0 | TiNbC, TiNbN, TiNbCN | 0.08 | 0.060 | 0.16 | 92 | 19.1 | Co | 0.04 | 240 |
| 5 | 74.5 | 0.49 | 6.4 | TiNbC, TiNbN, TiNbCN | 0.05 | 0.050 | 0.63 | 365 | 19.1 | Co | 0.03 | 230 |
| 6 | 75.0 | 0.50 | 5.9 | TiNbC, TiNbN, TiNbCN | 0.33 | 0.040 | 0.14 | 57 | 19.1 | Co | 0.03 | 230 |
| 7 | 72.6 | 0.51 | 8.3 | TiNbC, TiNbN, TiNbCN | 0.37 | 0.040 | 0.70 | 295 | 19.1 | Co | 0.02 | 240 |
| 8 | 80.8 | 0.55 | 0.1 | TiNbC, TiNbN, TiNbCN | 0.27 | 0.090 | 0.45 | 40 | 19.1 | Co | 0.04 | 220 |
| 9 | 65.9 | 0.43 | 15.0 | TiNbC, TiNbN, TiNbCN | 0.25 | 0.040 | 0.51 | 188 | 19.1 | Ni | 0.04 | 270 |
| 10 | 78.5 | 0.20 | 2.4 | TiNbC, TiNbN, TiNbCN | 0.25 | 0.050 | 0.54 | 74 | 19.1 | Co | 0.02 | 280 |
| 11 | 79.8 | 2.90 | 1.1 | TiNbC, TiNbN, TiNbCN | 0.23 | 0.050 | 0.60 | 49 | 19.1 | Co | 0.03 | 210 |
| 12 | 77.2 | 0.51 | 3.7 | TiNbC, TiNbN, TiNbCN | 0.03 | 0.080 | 0.52 | 86 | 19.1 | Co | 0.03 | 210 |
| 13 | 76.8 | 0.55 | 4.1 | TiNbC, TiNbN, TiNbCN | 0.46 | 0.100 | 0.30 | 55 | 19.1 | Co | 0.03 | 250 |
| 14 | 79.6 | 0.52 | 1.3 | TiNbC, TiNbN, TiNbCN | 0.20 | 0.010 | 0.31 | 56 | 19.1 | Co | 0.04 | 240 |
| 15 | 80.8 | 0.55 | 0.1 | TiNbC, TiNbN, TiNbCN | 0.27 | 0.090 | 0.50 | 40 | 19.1 | Co | 0.05 | 210 |
| 16 | 88.8 | 0.48 | 11.0 | TiNbC, TiNbN, TiNbCN | 0.08 | 0.060 | 0.16 | 92 | 0.18 | Co | 0.01 | 290 |
| 17 | 69.2 | 0.48 | 11.0 | TiNbC, TiNbN, TiNbCN | 0.08 | 0.060 | 0.16 | 92 | 19.8 | Co | 0.09 | 200 |

TABLE 5

| | Cemented carbide | | | | | | | | | Tool | |
|---|---|---|---|---|---|---|---|---|---|---|---|
| | First hard phase | Second hard phase/third hard phase | | | | | | Binder phase | | Cutting test | |
| Specimen No. | Vol % | Average particle diameter (μm) | Vol % | Composition | Nb ratio/Ta ratio | Average particle diameter (μm) | Dispersity | Number | Vol % | Composition | Adhesion resistance | Tool service life (m) |
| 18 | 77.9 | 0.47 | 3.0 | TiTaC, TiTaN, TiTaCN | 0.19 | 0.100 | 0.21 | 44 | 19.1 | Co | 0.02 | 240 |
| 19 | 77.7 | 0.48 | 3.2 | TiTaC, TiTaN, TiTaCN | 0.11 | 0.100 | 0.18 | 43 | 19.1 | Co | 0.04 | 230 |
| 20 | 76.4 | 0.46 | 4.5 | TiTaC, TiTaN, TiTaCN | 0.15 | 0.080 | 0.19 | 49 | 19.1 | Co | 0.03 | 230 |
| 21 | 78.6 | 0.54 | 2.3 | TiTaC, TiTaN, TiTaCN | 0.17 | 0.050 | 0.16 | 43 | 19.1 | Co | 0.02 | 240 |
| 22 | 77.8 | 0.51 | 3.1 | TiTaC, TiTaN, TiTaCN | 0.15 | 0.040 | 0.63 | 135 | 19.1 | Co | 0.04 | 230 |
| 23 | 78.2 | 0.47 | 2.7 | TiTaC, TiTaN, TiTaCN | 0.10 | 0.060 | 0.14 | 42 | 19.1 | Co | 0.02 | 230 |
| 24 | 77.6 | 0.52 | 3.3 | TiTaC, TiTaN, TiTaCN | 0.10 | 0.070 | 0.70 | 116 | 19.1 | Co | 0.04 | 240 |
| 25 | 80.8 | 0.56 | 0.12 | TiTaC, TiTaN, TiTaCN | 0.22 | 0.070 | 0.65 | 40 | 19.1 | Co | 0.04 | 220 |
| 26 | 66.9 | 0.44 | 14.0 | TiTaC, TiTaN, TiTaCN | 0.30 | 0.030 | 0.55 | 202 | 19.1 | Ni | 0.02 | 270 |
| 27 | 73.1 | 0.20 | 7.8 | TiTaC, TiTaN, TiTaCN | 0.34 | 0.030 | 0.41 | 381 | 19.1 | Co | 0.02 | 280 |
| 28 | 71.7 | 3.00 | 9.2 | TiTaC, TiTaN, TiTaCN | 0.40 | 0.040 | 0.38 | 346 | 19.1 | Co | 0.03 | 210 |
| 29 | 76.5 | 0.49 | 4.4 | TiTaC, TiTaN, TiTaCN | 0.04 | 0.050 | 0.33 | 82 | 19.1 | Co | 0.03 | 210 |
| 30 | 77.9 | 0.50 | 3.0 | TiTaC, TiTaN, TiTaCN | 0.48 | 0.040 | 0.27 | 56 | 19.1 | Co | 0.03 | 250 |
| 31 | 97.5 | 0.54 | 2.3 | TiTaC, TiTaN, TiTaCN | 0.17 | 0.050 | 0.10 | 41 | 0.18 | Co | 0.01 | 290 |
| 32 | 77.9 | 0.54 | 2.3 | TiTaC, TiTaN, TiTaCN | 0.17 | 0.050 | 0.20 | 0 | 19.8 | Co | 0.09 | 200 |
| 33 | 77.9 | 0.47 | 3.0 | TiNbC, TiNbN, TiNbCN | 0.19 | 0.100 | 0.21 | 30 | 19.1 | Co | 0.02 | 200 |
| 34 | 77.9 | 0.47 | 3.0 | TiTaC, TiTaN, TiTaCN | 0.19 | 0.100 | 0.21 | 30 | 19.1 | Co | 0.02 | 200 |

TABLE 6

| | Cemented carbide | | | | | | | | | Tool | |
|---|---|---|---|---|---|---|---|---|---|---|---|
| | First hard phase | Second hard phase/third hard phase | | | | | | Binder phase | | Cutting test | |
| Specimen No. | Vol % | Average particle diameter (μm) | Vol % | Composition | Nb ratio/Ta ratio | Average particle diameter (μm) | Dispersity | Number | Vol % | Composition | Adhesion resistance | Tool service life (m) |
| 35 | 78.1 | 0.45 | 2.8 | TiTaC, TiTaN, TiTaCN | 0.18 | 0.090 | 0.07 | 27 | 19.1 | Co | 0.02 | 200 |
| 36 | 77.9 | 0.44 | 3.0 | TiTaC, TiTaN, TiTaCN | 0.14 | 0.080 | 0.42 | 30 | 19.1 | Co | 0.03 | 200 |

TABLE 6-continued

| | Cemented carbide | | | | | | | | | Tool | |
|---|---|---|---|---|---|---|---|---|---|---|---|
| | First hard phase | | Second hard phase/third hard phase | | | | | | Binder phase | | Cutting test |
| Specimen No. | Vol % | Average particle diameter (μm) | Vol % | Composition | Nb ratio/ Ta ratio | Average particle diameter (μm) | Dispersity | Number | Vol % | Composition | Adhesion resistance | Tool service life (m) |
| 37 | 77.9 | 0.43 | 3.0 | TiTaC, TiTaN, TiTaCN | 0.14 | 0.080 | 0.38 | 30 | 19.1 | Co | 0.01 | 230 |
| 1-1 | 77.6 | 0.52 | 3.3 | TiNbC | 0.20 | 0.150 | 0.38 | 50 | 19.1 | Co | 0.12 | 140 |
| 1-2 | 74.9 | 0.50 | 6.0 | TiNbC, TiNbN, TiNbCN | 0.28 | 0.070 | 0.79 | 361 | 19.1 | Co | 0.11 | 160 |
| 1-3 | 63.9 | 0.60 | 17.0 | TiNbC, TiNbN, TiNbCN | 0.30 | 0.006 | 0.45 | 98 | 19.1 | Co | 0.10 | 170 |
| 1-4 | 80.9 | 0.53 | 0.1 | TiNbC, TiNbN, TiNbCN | 0.40 | 0.070 | 0.28 | 40 | 19.1 | Co | 0.12 | 120 |
| 1-5 | 97.0 | 0.54 | 3.0 | TiNbC, TiNbN, TiNbCN | 0.20 | 0.090 | 0.32 | 50 | 0 | — | 30 m, Defect | 30 |
| 1-6 | 74.0 | 0.57 | 4.0 | TiNbC, TiNbN, TiNbCN | 0.15 | 0.040 | 0.45 | 121 | 22.0 | Co | 120 m, Defect | 120 |
| 1-7 | 77.8 | 0.58 | 3.1 | TiTaC | 0.18 | 0.150 | 0.40 | 50 | 19.1 | Co | 0.13 | 150 |
| 1-8 | 78.1 | 0.55 | 2.8 | TiTaC, TiTaN, TiTaCN | 0.23 | 0.030 | 0.82 | 216 | 19.1 | Co | 0.15 | 130 |
| 1-9 | 63.9 | 0.49 | 17.0 | TiTaC, TiTaN, TiTaCN | 0.18 | 0.050 | 0.60 | 42 | 19.1 | Co | 0.10 | 170 |
| 1-10 | 80.9 | 0.48 | 0.05 | TiTaC, TiTaN, TiTaCN | 0.18 | 0.070 | 0.53 | 40 | 19.1 | Co | 0.12 | 120 |
| 1-11 | 97.7 | 0.49 | 2.3 | TiTaC, TiTaN, TiTaCN | 0.17 | 0.080 | 0.38 | 50 | 0 | — | 30 m, Defect | 30 |
| 1-12 | 76.1 | 0.55 | 1.9 | TiTaC, TiTaN, TiTaCN | 0.12 | 0.100 | 0.40 | 46 | 22.00 | Co | 120 m, Defect | 120 |
| 1-13 | 69.0 | 0.42 | 15.6 | TiWNbCN | — | 0.220 | 0.93 | 33 | 15.4 | Co | 0.24 | 90 |
| 1-14 | 87.0 | 0.40 | 3.0 | TiCN | — | 0 030 | 0.85 | 257 | 10.0 | Co | 0.15 | 120 |
| 1-15 | 77.9 | 0.47 | 3.0 | TiTaC, TiTaN, TiTaCN | 0.19 | 0.120 | 0.21 | 21 | 19.1 | Co | 0.02 | 100 |

<Discussion>

The cemented carbides and the tools of Specimen 1 to Specimen 37 correspond to the examples. The cemented carbides and the tools of Specimen 1-1 to Specimen 1-15 correspond to comparative examples. It was confirmed that, in the tools of Specimen 1 to Specimen 37 (examples), compared with the tools of Specimen 1-1 to Specimen 1-15 (comparative examples), the adhesion resistance was excellent and the tool service lives were long in the high-efficiency processing of a difficult-to-cut material.

The embodiments and Examples of the present disclosure have been described as described above, and originally, appropriate combinations or various modifications of the configurations of individual embodiments and Examples described above are also planned.

The embodiments and Examples disclosed this time shall be considered to be exemplary in all aspects and to limit nothing. The scope of the present invention is shown not by the above-described embodiments and Examples but by the claims and is intended to include equivalent meaning to the claims and all modifications within the scope.

REFERENCE SIGNS LIST

3: Blade edge; 5: Deposit

The invention claimed is:

1. A cemented carbide composed of a first hard phase, a second hard phase and a binder phase,
wherein the first hard phase is composed of tungsten carbide particles,
the second hard phase is composed of at least one first compound selected from the group consisting of TiNbC, TiNbN and TiNbCN,
the second hard phase has an average particle diameter of no more than 0.1 μm,
the second hard phase has a dispersity of no more than 0.7,
the second hard phase has a content of no less than 0.1 vol % and no more than 15 vol %,
the binder phase contains at least one first element selected from the group consisting of iron, cobalt and nickel, and
the binder phase has a content of no less than 0.1 vol % and no more than 20 vol %.

2. The cemented carbide according to claim 1, wherein, in a 24.9 μm×18.8 μm rectangular measurement visual field set in an image, resulting from a binarization treatment of a backscattered electron image that is obtained by capturing a cross section of the cemented carbide with a scanning electron microscope, the number of the second hard phases is no less than 30.

3. The cemented carbide according to claim 1, wherein the second hard phase has an average particle diameter of no less than 0.01 μm and no more than 0.08 μm.

4. The cemented carbide according to claim 1, wherein the second hard phase has a dispersity of no more than 0.4.

5. The cemented carbide according to claim 1, wherein the dispersity is a standard deviation of an area of each Voronoi cell in a Voronoi diagram that is obtained by performing a Voronoi partition with a center of gravity of the second hard phase as a generator, and
the Voronoi diagram is obtained by extracting the second hard phases in a backscattered electron image obtained by capturing a cross section of the cemented carbide with a scanning electron microscope, setting a 24.9 μm×18.8 μm rectangular measurement visual field in an image resulting from a binarization treatment of the backscattered electron image, performing Voronoi partitions with centers of gravity of the extracted second hard phases as generators and calculating Voronoi cells of all of the generators.

6. A cemented carbide composed of a first hard phase, a third hard phase and a binder phase,
wherein the first hard phase is composed of tungsten carbide particles, the third hard phase is composed of at least one second compound selected from the group consisting of TiTaC, TiTaN and TiTaCN, the third hard phase has an average particle diameter of no more than 0.1 μm, the third hard phase has a dispersity of no more than 0.7, the third hard phase has a content of no less than 0.1 vol % and no more than 15 vol %, the binder phase contains at least one first element selected from the group consisting of iron, cobalt and nickel, and the binder phase has a content of no less than 0.1 vol % and no more than 20 vol %.

7. A tool comprising the cemented carbide according to claim 1.

8. A tool comprising the cemented carbide according to claim 6.

\* \* \* \* \*